US012246306B2

(12) United States Patent
Bassou et al.

(10) Patent No.: US 12,246,306 B2
(45) Date of Patent: Mar. 11, 2025

(54) CATALYST FOR REDUCING NITROGEN OXIDES

(71) Applicant: UMICORE AG & CO. KG, Hanau-Wolfgang (DE)

(72) Inventors: Badr Bassou, Frankfurt (DE); Anke Woerz, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 262 days.

(21) Appl. No.: 17/776,180

(22) PCT Filed: Nov. 18, 2020

(86) PCT No.: PCT/EP2020/082489
§ 371 (c)(1),
(2) Date: May 11, 2022

(87) PCT Pub. No.: WO2021/099361
PCT Pub. Date: May 27, 2021

(65) Prior Publication Data
US 2022/0401920 A1    Dec. 22, 2022

(30) Foreign Application Priority Data

Nov. 20, 2019  (EP) .................................... 19210276

(51) Int. Cl.
| *B01J 21/04* | (2006.01) |
| *B01J 23/58* | (2006.01) |
| *B01J 23/63* | (2006.01) |
| *B01J 29/06* | (2006.01) |
| *B01J 29/068* | (2006.01) |
| *B01J 37/02* | (2006.01) |
| *F01N 3/20* | (2006.01) |

(52) U.S. Cl.
CPC ............. *B01J 21/04* (2013.01); *B01J 23/58* (2013.01); *B01J 23/63* (2013.01); *B01J 29/068* (2013.01); *F01N 3/2066* (2013.01); *B01J 37/0246* (2013.01)

(58) Field of Classification Search
CPC ... B01J 21/04; B01J 23/58; B01J 23/63; B01J 23/002; B01J 29/068; B01J 37/0246; B01J 35/19; B01J 2229/186; B01J 2523/00; B01J 2523/25; B01J 2523/31; B01J 2523/3712; B01J 2523/824; B01J 2523/828; B01J 2523/22; F01N 3/2066; F01N 3/08; F01N 2510/0684; B01D 2255/1021; B01D 2255/1023; B01D 2255/2042; B01D 2255/2047; B01D 2255/2065; B01D 2255/2092; B01D 2255/40; B01D 2255/50; B01D 2255/9022; B01D 2255/9025; B01D 2255/91; B01D 2257/404; B01D 2258/012; B01D 53/9418; B01D 53/9477; B01D 53/9422; B01D 53/9468; B01D 2258/01; Y02A 50/20; Y02T 10/12
See application file for complete search history.

(56) References Cited

U.S. PATENT DOCUMENTS

| 3,355,246 A | 11/1967 | Kuehl |
| 3,702,886 A | 11/1972 | Argauer et al. |
| 3,933,974 A | 1/1976 | Winquist |
| 4,000,248 A | 12/1976 | Martin |
| 4,076,842 A | 2/1978 | Plank et al. |
| 4,107,196 A | 8/1978 | Frye et al. |
| 4,139,600 A | 2/1979 | Rollmann et al. |
| 4,251,499 A | 2/1981 | Nanne et al. |
| 4,310,440 A | 1/1982 | Wilson et al. |
| 4,439,409 A | 3/1984 | Puppe et al. |
| 4,544,538 A | 10/1985 | Zones |
| 4,657,750 A | 4/1987 | Takatsu et al. |
| 4,695,440 A | 9/1987 | Morimoto et al. |
| 4,705,674 A | 11/1987 | Araya et al. |
| 4,826,667 A | 5/1989 | Zones et al. |
| 4,859,442 A | 8/1989 | Zones et al. |

(Continued)

FOREIGN PATENT DOCUMENTS

| BE | 1001038 A7 | 6/1989 |
| CN | 103052444 A | 4/2013 |

(Continued)

OTHER PUBLICATIONS

Second Office Action dated Sep. 21, 2023 for Chinese Patent Application No. 202080060789.3 (8 pages in Chinese; 12 pages English Translation).
Extended European Search Report Mailed May 4, 2020 for European Patent Application Np. 19210276.2 (6 pages).
International Preliminary Report on Patentability mailed May 17, 2022 for International Patent Application No. PCT/EP2020/082489 (6 pages).

(Continued)

*Primary Examiner* — Dapinder Singh
(74) *Attorney, Agent, or Firm* — Smith, Gambrell & Russell, LLP

(57) ABSTRACT

The present invention relates to a catalyst comprising a carrier substrate of length L and at least two washcoat layers A and B wherein
  washcoat layer A comprises
    alumina;
    ceria;
    an alkaline earth compound and/or an alkali compound;
    platinum, palladium or platinum and palladium;
  washcoat layer B comprises a zeolite and palladium, wherein the palladium is present as palladium cation in the zeolite structure or is wholly or partially present as palladium metal and/or as palladium oxide in the zeolite structure and/or on the surface of the zeolite structure; and
wherein washcoat layer A is arranged below washcoat layer B.

9 Claims, No Drawings

(56) References Cited

U.S. PATENT DOCUMENTS

| | | | |
|---|---|---|---|
| 5,314,674 | A | 5/1994 | Di R Francesco et al. |
| 5,677,258 | A | 10/1997 | Kurokawa et al. |
| 5,958,370 | A | 9/1999 | Zones et al. |
| 5,968,474 | A | 10/1999 | Nakagawa et al. |
| 6,077,498 | A | 6/2000 | Diaz Cabañas et al. |
| 6,709,644 | B2 | 3/2004 | Zones et al. |
| 8,617,474 | B2 | 12/2013 | Bull et al. |
| 10,151,227 | B2 | 12/2018 | Armitage et al. |
| 10,428,708 | B2 | 10/2019 | Utschig et al. |
| 10,443,463 | B2 | 10/2019 | Hoyer et al. |
| 10,857,521 | B2* | 12/2020 | Sung ..................... B01J 29/783 |
| 2008/0141661 | A1 | 6/2008 | Voss et al. |
| 2009/0320457 | A1 | 12/2009 | Wan |
| 2014/0170062 | A1 | 6/2014 | Moscoso |
| 2014/0260214 | A1* | 9/2014 | Xue ..................... B01J 37/0244 60/299 |
| 2014/0322112 | A1 | 10/2014 | Blakeman et al. |
| 2015/0118150 | A1 | 4/2015 | Yang et al. |
| 2017/0001169 | A1 | 1/2017 | Collier et al. |
| 2017/0320046 | A1* | 11/2017 | Armitage ................. B01J 23/63 |
| 2017/0356317 | A1* | 12/2017 | Armitage ............ B01J 37/0234 |
| 2019/0120109 | A1 | 4/2019 | Clark et al. |
| 2022/0072514 | A1* | 3/2022 | Chandler .............. F01N 3/0814 |

FOREIGN PATENT DOCUMENTS

| | | |
|---|---|---|
| CN | 105813745 A | 7/2016 |
| CN | 107148310 A | 9/2017 |
| CN | 107405606 A | 11/2017 |
| DE | 19617123 A1 | 10/1996 |
| DE | 102016112065 A1 | 1/2017 |
| DE | 102016112536 A1 | 1/2017 |
| EP | 0 040 016 A1 | 11/1981 |
| EP | 0 055 529 A1 | 7/1982 |
| EP | 0 103 981 A1 | 3/1984 |
| EP | 0 255 770 A2 | 2/1988 |
| EP | 0 288 293 A2 | 10/1988 |
| EP | 0 885 650 A2 | 12/1998 |
| EP | 1 398 069 A2 | 3/2004 |
| EP | 1 420 149 A2 | 5/2004 |
| EP | 1 433 519 A1 | 6/2004 |
| EP | 1 820 561 A1 | 8/2007 |
| EP | 2 505 803 A2 | 10/2012 |
| EP | 3 009 400 A1 | 4/2016 |
| EP | 3 403 722 A1 | 11/2018 |
| EP | 3 476 480 A1 | 5/2019 |
| WO | 2008/047170 A1 | 4/2008 |
| WO | 2008/106519 A1 | 9/2008 |
| WO | 2008/118434 A1 | 10/2008 |
| WO | 2008/132452 A2 | 11/2008 |
| WO | 2011/154913 A1 | 12/2011 |
| WO | 2012/029050 A1 | 3/2012 |
| WO | 2012/166868 A1 | 12/2012 |
| WO | 2014/184568 A1 | 11/2014 |
| WO | 2015/085303 A1 | 6/2015 |
| WO | 2015085305 A1 | 6/2015 |
| WO | 2016/020351 A1 | 2/2016 |
| WO | 2016/077667 A1 | 5/2016 |

OTHER PUBLICATIONS

International Search Report dated Feb. 15, 2021 for International Patent Application No. PCT/EP2020/082489 (4 pages).

Written Opinion of the International Searching Authority dated Feb. 15, 2021 for International Patent Application No. PCT/EP2020/082489 (5 pages).

DIN 66132, Determination Of Specific Surface Area of Solids by adsorption of Nitrogen; Single Point Differential Method According to Haul and Dümbgen, Jul. 1975_(5 Pages in German with English translation).

Lawton, S. L.et al. J. Chem. Soc., Chem. Commun., Synthesis and Proposed Framework Topology of Zeolite SUZ-4. 1993 pp. 894-896.

Leiggener et al. Zeolite A and ZK-4. Material Syntheses, Springer Vienna, 2008 (Editors Schubert, Hüsing, Laine), pp. 21-28.

Macmillan Journals Ltd. 1978, Synthesis and Structure of Synthetic Zeolite ZSM-11. Nature. 1978. vol. 275. pp. 119-120.

Miyoshi, N. et al. SAE Technical Paper Series 950809, Development of New Concept Three-Way Catalyst for Automotive Lean-Burn Engines. 1995. pp. 2121-2130.

T. Mayer, Feststoff-SCR-System auf Basis von Ammoniumcarbamat [Solid SCR System Based upon Ammonium Carbamate], Dissertation, TU Kaiserslautern, 2005. 154 pages.

Baerlocher, et al., Atlas of Zeolite Framework Types, 5th revised edition, 2001, ISBN: 0-444-50701-9, pp. 1-306.

First Office Action dated Apr. 29, 2023 for Chinese Patent Application No. 202080060789.3 (9 pages in Chinese; 7 pages English Translation).

Office Action dated Dec. 16, 2024 for Japanese Patent Application No. 2022-517454 (3 pages in Japanese; 2 pages English Translation).

* cited by examiner

CATALYST FOR REDUCING NITROGEN OXIDES

The present invention relates to catalyst for reducing nitrogen oxides which combines a lean NOx trap and a passive nitrogen oxide adsorber.

The exhaust gas of motor vehicles that are operated with lean-burn combustion engines, such as diesel engines, also contain, in addition to carbon monoxide (CO) and nitrogen oxides ($NO_x$), components that result from the incomplete combustion of the fuel in the combustion chamber of the cylinder. In addition to residual hydrocarbons (HC), which are usually also predominantly present in gaseous form, these include particle emissions, also referred to as "diesel soot" or "soot particles." These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible. This is only possible with the use of suitable catalysts.

Soot particles may be very effectively removed from the exhaust gas with the aid of particle filters. Wall-flow filters made from ceramic materials have especially proven themselves. These wall-flow filters are made up of a plurality of parallel channels that are formed by porous walls. The channels are alternately sealed at one of the two ends of the filter so that first channels are formed that are open at the first side of the filter and sealed at the second side of the filter, and second channels are formed that are sealed at the first side of the filter and open at the second side of the filter. The exhaust gas flowing into the first channels, for example, may leave the filter again only via the second channels and must flow through the porous walls between the first and second channels for this purpose. The particles are retained when the exhaust gas passes through the wall.

It is known that particle filters may be provided with catalytically-active coatings. EP1820561A1 describes, for example, the coating of a diesel particle filter having a catalyst layer which facilitates the burning off of filtered soot particles.

A known method for removing nitrogen oxides from exhaust gases in the presence of oxygen is selective catalytic reduction (SCR method) by means of ammonia on a suitable catalyst. In this method, the nitrogen oxides to be removed from the exhaust gas are converted to nitrogen and water using ammonia.

Iron-exchanged and, in particular, copper-exchanged zeolites, for example, may be used as SCR catalysts; see, for example, WO2008/106519 A1, WO2008/118434 A1, and WO2008/132452 A2.

SCR catalysts for converting nitrogen oxides with ammonia contain no precious metals—in particular, no platinum or palladium. In the presence of these metals, the oxidation of ammonia with oxygen to form nitrogen oxides would actually take place preferentially, and the SCR reaction (reaction of ammonia with nitrogen oxide) would fall behind. Insofar as the literature occasionally refers to platinum-exchanged or palladium-exchanged zeolites as "SCR catalysts," this does not relate to the $NH_3$-SCR reaction, but rather to the reduction of nitrogen oxides by means of hydrocarbons. However, the latter reaction is only slightly selective, so that it is more accurately referred to as "HC-DeNOx reaction" instead of "SCR reaction."

The ammonia used as reducing agent may be made available by feeding an ammonia precursor compound, e.g., urea, ammonium carbamate, or ammonium formate, into the exhaust gas stream, and by subsequent hydrolysis.

The disadvantage of SCR catalysts is that they only work from an exhaust gas temperature of approx. 180 to 200° C. and do not, therefore, convert nitrogen oxides that are formed in the engine's cold-start phase.

In order to remove the nitrogen oxides, so-called nitrogen oxide storage catalysts are also known, for which the terms, "Lean NOx Trap," or LNT or "Nitrogen Storage Catalyst" or NSC, are common. Their cleaning action is based upon the fact that in a lean operating phase of the engine, the nitrogen oxides are predominantly stored in the form of nitrates by the storage material of the storage catalyst, and the nitrates are broken down again in a subsequent rich operating phase of the engine, and the nitrogen oxides which are thereby released are converted with the reducing exhaust gas components in the storage catalyst to nitrogen, carbon dioxide, and water. This operating principle is described in, for example, SAE document SAE 950809.

As storage materials, oxides, carbonates, or hydroxides of magnesium, calcium, strontium, barium, alkali metals, rare earth metals, or mixtures thereof come, in particular, into consideration. As a result of their alkaline properties, these compounds are able to form nitrates with the acidic nitrogen oxides of the exhaust gas and to store them in this way. They are deposited in the most highly dispersed form possible on suitable substrate materials in order to produce a large interaction surface with the exhaust gas. In addition, nitrogen oxide storage catalysts generally contain precious metals such as platinum, palladium, and/or rhodium as catalytically-active components. It is their purpose to, on the one hand, oxidize NO to $NO_2$, as well as CO and HC to $CO_2$, under lean conditions and to, on the other hand, reduce released $NO_2$ to nitrogen during the rich operating phases, in which the nitrogen oxide storage catalyst is regenerated.

Modern nitrogen oxide storage catalysts are described in, for example, EP0885650A2, US2009/320457, WO2012/029050A1, and WO2016/020351A1.

It is already known to combine soot particle filters and nitrogen oxide storage catalysts. EP1420149A2 and US2008/141661, for example, thus describe systems comprising a diesel particle filter and a nitrogen oxide storage catalyst arranged downstream.

Moreover, EP1393069A2, EP1433519A1, EP2505803A2, and US2014/322112, for example, already propose that particle filters be coated with nitrogen oxide storage catalysts.

US2014/322112 describes a zoning of the coating of the particle filter with a nitrogen oxide storage catalyst, such that one zone starting from the upstream end of the particle filter is located in the input channels, and another zone starting from the downstream end of the particle filter is located in the output channels.

The procedure described in SAE Technical Paper 950809, in which the nitrogen oxides are stored by a nitrogen oxide storage catalyst in a lean-burn operating phase of the engine and are released again in a subsequent rich operating phase, is also referred to as active nitrogen oxide storage.

In addition, a method known as passive nitrogen oxide storage has also been described. Nitrogen oxides are stored thereby in a first temperature range and released again in a second temperature range, wherein the second temperature range lies at higher temperatures than the first temperature range. Passive nitrogen oxide storage catalysts are used to implement this method, which catalysts are also referred to as PNA (for "passive NOx adsorbers").

By means of passive nitrogen oxide storage catalysts, nitrogen oxides may—particularly at temperatures below 200° C., at which an SCR catalyst has not yet reached its operating temperature—be stored and released again as soon as the SCR catalyst is ready for operation. Thus, an increased total nitrogen oxide conversion is realized in the exhaust gas after-treatment system by the interim storage below 200° C. of the nitrogen oxides emitted by the engine, as well as the concerted release of those nitrogen oxides above 200° C.

Palladium supported on cerium oxide has been described as a passive nitrogen oxide storage catalyst (see, for example, WO2008/047170A1 and WO2014/184568A1). From WO2012/166868TA1, it is known to use a zeolite as a passive nitrogen oxide storage catalyst, which zeolite contains, for example, palladium and a further metal, such as iron, for example.

WO2015/085303 A1 discloses passive nitrogen oxide storage catalysts which contain a precious metal and a small-pore molecular sieve with a maximum ring size of eight tetrahedral atoms.

To fulfill the future coming tightening legislation a new catalytic system is needed that store/treat nitrogen oxides under all driving conditions. That means at low temperatures and cold start as well as at higher temperatures and acceleration phases. The actual standard system is generally a combination of two systems, a NOx storage catalyst in close-coupled position and a SCR or SDPF catalyst in under floor position. The NSC has a broad operation window that overlaps with the SCR catalyst but in view of the new legislation including introduction of RDE (real driving emissions), it is nevertheless not effective enough at low temperatures. The strategy for future systems is to focus the first brick including the NSC to the low temperature side which needs to be fully effective until a temperature at which the downstream SCR catalyst is working. Furthermore, the first brick needs to oxidize CO, HC and NO.

It has now been found that a combination of a nitrogen storage catalyst and a passive NOx adsorber provides high NOx storage at low and intermediate temperatures until the downstream SCR catalyst is working. In addition, in contrast to a classical NOx storage catalyst the combination provides stable HC and CO Light-Off since no frequent rich activation is needed.

The present invention relates, therefore, to a catalyst comprising a carrier substrate of length L and at least two washcoat layers A and B wherein
washcoat layer A comprises
alumina;
ceria;
an alkaline earth compound and/or an alkali compound;
platinum, palladium or platinum and palladium;
washcoat layer B comprises a zeolite and palladium, wherein the palladium is present as palladium cation in the zeolite structure or is wholly or partially present as palladium metal and/or as palladium oxide in the zeolite structure and/or on the surface of the zeolite structure; and
wherein washcoat layer A is arranged below washcoat layer B.

The alumina contained in washcoat layer A is in an embodiment of the present invention stabilized by 1 to 6 wt %, in particular 4 wt %, of lanthanum oxide. Washcoat layer A comprises alumina in particular in an amount of 25 to 100 g/L, based on the volume of the carrier substrate, preferably in an amount of 50 to 80 g/L, based on the volume of the carrier substrate.

Within the context of the present invention, the term ceria means a commercial grade cerium oxide, i.e., cerium oxide with a cerium oxide share of 90 to 100 wt %. Washcoat layer A comprises cerium oxide in particular in an amount of 80 to 150 g/L, based on the volume of the carrier substrate, preferably in an amount of 100 to 130 g/L, based on the volume of the carrier substrate.

In an embodiment of the present invention washcoat layer A comprises a composite material of ceria and alumina which preferably comprises alumina in an amount of 5 to 95 wt %, based on the weight of the composite material. Preferably, the amount of alumina is 80 to 95 wt % and the amount of ceria 5 to 20 wt %, based on the weight of the composite material.

Washcoat layer A comprises the composite material of ceria and alumina in an amount of 0 to 100 g/L, based on the volume of the carrier substrate, preferably in an amount of 10 to 80 g/L, based on the volume of the carrier substrate.

Suitable as alkaline earth compound in washcoat layer A are, in particular, oxides, carbonates or hydroxides of magnesium, strontium and barium, particularly, magnesium oxide, barium oxide, and strontium oxide. Preferred are magnesium oxide and/or barium oxide.

Suitable as alkali compound in washcoat layer A are, in particular, oxides, carbonates, or hydroxides of lithium, potassium, or sodium.

In embodiments of the present invention, the alkaline earth or alkali compound is present in quantities of 10 to 50 g/L, particularly 15 to 20 g/L, calculated as alkaline earth or alkaline oxide and based on the volume of the carrier substrate. In washcoat layer A the alkaline earth or alkali compound is usually supported on alumina, ceria and/or, if present, the composite material of ceria and alumina.

Washcoat layer A can comprise only platinum and no palladium, only palladium and no platinum or both, platinum and palladium. In the latter case the weight ratio of platinum and palladium can broadly vary but is preferably in the range of 1:5 to 20:1, more preferably in the range of 1:1 to 12:1. Possible weight ratios of platinum and palladium are 2:1, 3:1, 4:1, 5:1, 6:1, 7:1, 8:1, 9:1, 10:1, 11:1 and 12:1.

Washcoat layer A comprises platinum, palladium and platinum and palladium, respectively, preferably in an amount of 20 to 150, more preferably 50 to 120 g/cft, based on the volume of the carrier substrate.

In washcoat layer A platinum, palladium and platinum and palladium, respectively, are usually supported on alumina, ceria and/or, if present, the composite material of ceria and alumina.

In an embodiment of the present invention, washcoat layer A comprises rhodium. Rhodium is usually supported on alumina, ceria and/or, if present, the composite material of ceria and alumina. The amount of rhodium in washcoat layer A is usually from 0 to 10 g/cft, in particular 1 to 8 g/cft, based on the volume of the carrier substrate.

The loading with washcoat layer A preferably amounts to 150 to 300 g/L, based on the volume of the carrier substrate.

In a further embodiment of the present invention, the catalyst comprises a third washcoat layer A1 which comprises rhodium and which is arranged above washcoat layer A and below washcoat layer B.

Rhodium in washcoat layer A1 is usually present on a suitable carrier material. All materials that are familiar to the person skilled in the art for this purpose are considered as carrier materials. They have a BET surface of 30 to 250 m$^2$/g, preferably, of 100 to 200 m$^2$/g (specified according to DIN 66132) and are, in particular, alumina, silica, magnesia, titania, and mixtures or mixed oxides of at least two of these materials.

Alumina, magnesia/alumina mixed oxides, and alumina/silica mixed oxides are preferred. If alumina is used, it is particularly preferable that it be stabilized, e.g., with 1 to 6 wt %, in particular 4 wt % of lanthanum oxide.

Washcoat layer B of the catalyst according to the present invention comprises a zeolite. Zeolites are two- or three-dimensional structures, the smallest structures of which can be considered to be SiO$_4$ and AlO$_4$ tetrahedra. These tetrahedra come together to form larger structures, wherein two are connected each time via a common oxygen atom. Different-sized rings may be formed thereby, for example, rings of four, six, or even nine tetrahedrally-coordinated silicon or aluminum atoms. The different types of zeolite are often defined via the largest ring size, because this size determines which guest molecules can penetrate the zeolite structure, and which not. It is customary to differentiate between large-pore zeolites with a maximum ring size of 12, medium-pore zeolites with a maximum ring size of 10, and small-pore zeolites with a maximum ring size of 8.

Furthermore, zeolites are grouped by the Structural Commission of the International Zeolite Association into structural types which are each provided with a three-letter code; see, for example, Atlas of Zeolite Framework Types, Elsevier, 5th edition, 2001.

The zeolite of washcoat layer B can be a large-pore zeolite, a medium-pore zeolite or a small-pore zeolite.

In an embodiment of the present invention, the zeolite of washcoat layer B comprises a largest ring size formed by 6 tetrahedrally-coordinated atoms and belongs for example to the structural type AFG, AST, DOH, FAR, FRA, GIU, LIO, LOS, MAR, MEP, MSO, MTN, NON, RUT, SGT, SOD, SVV, TOL or UOZ.

A zeolite of the structural type AFG is Afghanite. Zeolites of the structural type AST are AlPO-16 and Octadecasile. A zeolite of the structural type DOH is Docecasile 1H. A zeolite of the structural type FAR is Farneseite. A zeolite of the structural type FRA is Franzinite. A zeolite of the structural type GIU is Giuseppettite. A zeolite of the structural type LIO ist Liottite. Zeolite of the structural type LOS are Losode and Bystrite. A zeolite of the structural type MAR is Marinellite. A zeolite of the structural type MEP is Melanophlogite. Zeolites of the structural type MSO are MCM-61 and Mu-13. Zeolites of the structural type MTN are ZSM-39, CF-4, Docecasile-3C and Holdstite. Zeolites of the structural type NON are Nonasile, CF-3 and ZSM-51. Zeolites of the structural type RUT are RUB-10 and Nu-1. A zeolite of the structural type SGT is Sigma-2. Zeolites of the structural type SOD are Sodalite, AlPO-20, Bicchulite, Danalite, G, Genthelvite, Hauyne, Herlvine, Nosean, SIZ-9, TMA and Tugtupite. A zeolite of the structural type UOZ is IM-10.

A preferred zeolite of washcoat layer B which comprises a largest ring size formed by 6 tetrahedrally-coordinated atoms belongs to the structural type SOD.

In particular preferred zeolites of washcoat layer B which belong to the structural type SOD are known from literature. For example, the synthesis of AlPO-20 is disclosed in U.S. Pat. No. 4,310,440.

In another embodiment of the present invention, the zeolite of washcoat layer B comprises a largest ring size formed by 8 tetrahedrally-coordinated atoms and belongs for example to the structural type ABW, ACO, AEI, AEN, AFN, AFT, AFV, AFX, ANA, APC, APD, ATN, ATT, ATV, AVL, AWO, AWW, BCT, BIK, BRE, CAS, CDO, CHA, DDR, DFT, EAB, EDI, EEI, EPI, ERI, ESV, ETL, GIS, GOO, IFY, IHW, IRN, ITE, ITW, JBW, JNT, JOZ, JSN, JSW, KFI, LEV, -LIT, LTA, LTJ, LTN, MER, MON, MTF, MWF, NPT, NSI, OWE, PAU, PHI, RHO, RTH, RWR, SAS, SAT, SAV, SBN, SIV, THO, TSC, UEI, UFI, VNI, YUG or ZON.

A zeolite of the structural type ABW is Li-A. A zeolite of the structural type ACO is ACP-1. Zeolites of the structural type AEI are SAPO-18, SIZ-8 and SSZ-39. Zeolites of the structural type AEN are AlPO-53, IST-2, JDF-2, MCS-1, Mu-10 and UiO-12-500. A zeolite of the structural type AFT is AlPO-52. Zeolites of the structural type AFX are SAPO-56 and SSZ-16. Zeolites of the structural type ANA are Analcime, AlPO-24, Leucite, Na—B, Pollucite and Wairakite. Zeolites of the structural type APC are AlPO-C and AlPO-H3. Zeolites of the structural type APD are AlPO-D and APO-CJ3. Zeolites of the structural type ATN are MAPO-39 and SAPO-39. Zeolites of the structural type ATT are AlPO-33 und RMA-3. A zeolite of the structural type ATV is AlPO-25. A zeolite of the structural type AWO is AlPO-21. A zeolite of the structural type AWW is AlPO-22. Zeolites of the structural type BCT are Metavariscite and Svyatoslavite. A zeolite of the structural type BIK is Bikitaite. Zeolites of the structural type BRE are Brewsterite and CIT-4. A zeolite of the structural type CAS is EU-20b. Zeolites of the structural type CDO are CDS-1, MCM-65 and UZM-25. Zeolites of the structural type CHA are AlPO-34, Chabazit, DAF-5, Linde-D, Linde-R, LZ-218, Phi, SAPO-34, SAPO-47, SSZ-13, UiO-21, Willherndersonite, ZK-14 and ZYT-6. Zeolites of the structural type DDR are Sigma-1 and ZSM-58. Zeolite of the structural type DFT are DAF-2 and ACP-3. Zeolites of the structural type EAB are TMA-E and Bellbergite. Zeolites of the structural type EDI are Edingtonite, K-F, Linde F and Zeolite N. Zeolites of the structural type ERI are Erionite, AlPO-17, Linde T, LZ-220, SAPO-17 and ZSM-34. A zeolite of the structural type ESV is ERS-7. Zeolites of the structural type GIS are Gismondine, Amicite, Garronite, Gobbinsite, MAPO-43, Na-P1, Na-P2 and SAPO-43. A zeolite of the structural type IHW is ITQ-3. Zeolites of the structural type ITE are ITQ-3, Mu-14 and SSZ-36. A zeolite of the structural type ITW is ITQ-12. Zeolites of the structural type JBW are Na-J and Nepheline. Zeolites of the structural type KFI are ZK-5, P and Q. Zeolites of the structural type LEV are Levyne, Levynite, AlP-35, LZ-132, NU-3, SAPO-35 and ZK-20. A zeolite of the structural type -LIT is Lithosite. Zeolites of the structural type LTA are Linde Typ A, Alpha, ITQ-29, LZ-215, N-A, UZM-9, SAPO-42, ZK-21, ZK-22 and ZK-4. Zeolites of the structural type LTN are Linde Typ N and NaZ-21. Zeolites of the structural type MER are Merlinoite, K-M, Linde W and Zeolite W. Zeolites of the structural type MTF are MCM-35 and UTM-1. Zeolites of the structural type NSI are Nu-6(2) and EU-20. Zeolites of the structural type OWE are UiO-28 and ACP-2. Zeolites of the structural type PAU are Paulimgite and ECR-18. Zeolites of the structural type PHI are Philippsite, DAF-8, Harmotome, Wellsite nd ZK-19. Zeolites of the structural type RHO are Rho and LZ-214. Zeolites of the structural type RTH are RUB-13, SSZ-36 and SSZ-50. A zeolite of the structural type RWR is RUB-24. Zeolites of the structural type SAS are STA-6 and SSZ-73. A zeolite of the structural type SAT is STA-2. Zeolites of the structural type SBN are UCSB-89 and SU-46. A zeolite of the structural type SIV is SIZ-7. A zeolite of the structural type THO ist Thomsonite. A zeolite of the structural type UEI is Mu-18. A zeolite of the structural type UFI is UZM-5. A zeolite of the structural type VNI is VPI-9. Zeolites of the structural type YUG are Yugawaralit and Sr-Q. Zeolites of the structural type ZON are ZAPO-M1 and UiO-7.

A preferred zeolite of washcoat layer B which comprises a largest ring size formed by 8 tetrahedrally-coordinated atoms belongs to the structural type ABW, AEI, AFX, CHA, ERI, ESV, KFI, LEV or LTA.

The synthesis of zeolites of the structural type AEI are for example disclosed in US 2015/118150 and the synthesis of SSZ-39 in U.S. Pat. No. 5,958,370. Zeolites of the structural type AFX are known from WO2016/077667A1. Zeolites of the structural type CHA are extensively described in literature, see for example U.S. Pat. No. 4,544,538 for SSZ-13. ZK-5, which belongs to the structural type KFI is for example described in EP288293A2. Zeolites of the structural type LEV are for example disclosed in EP40016A1, EP255770A2 and EP3009400A1. Zeolites of the structural type LTA are known as SAPO-42, ZK-4, ZK-21 and ZK-22. For example, the synthesis of ZK-4 is disclosed by Leiggener et al. in Material Syntheses, Springer Vienna, 2008 (Editors Schubert, Husing, Laine), Seiten 21-28). ZK-21 is disclosed in U.S. Pat. No. 3,355,246 and SAPO-42 in US2014/170062.

In another embodiment of the present invention, the zeolite of washcoat layer B comprises a largest ring size formed by 9 tetrahedrally-coordinated atoms and belongs for example to the structural type -CHI, LOV, NAB, NAT, RSN, STT oder VSV angehört.

A zeolite of the structural type -CHI is Chiavennit. A zeolite of the structural type LOV is Lovdarit. A zeolite of the structural type NAB is Nabesit. Zeolites of the structural type NAT are Natrolite, Gonnardite, Mesolite, Metanatrolite, Paranatrolite, Tetranatrolite and Scolecite. A zeolite of the structural type RSN is RUB-17. A zeolite of the structural type STT is SSZ-23. Zeolites of the structural type VSV are Gaultite, VPI-7 and VSV-7.

A preferred zeolite of washcoat layer B which comprises a largest ring size formed by 9 tetrahedrally-coordinated atoms belongs to the structural type STT. A zeolite of the structural type STT which is in particular suitable is SSZ-23. SSZ-23 is described in U.S. Pat. No. 4,859,442 and can be obtained in line with the method described therein.

In another embodiment of the present invention, the zeolite of washcoat layer B comprises a largest ring size formed by 10 tetrahedrally-coordinated atoms and belongs for example to the structural type FER, MEL, MFI, MTT, MWW or SZR.

Zeolites of the structural type FER are known from literature. ZSM-35 is disclosed in U.S. Pat. No. 4,107,196, NU-23 in EP103981A1, FU-9 in EP55529A1, ISI-6 in U.S. Pat. No. 4,695,440 and Ferrierite for example in U.S. Pat. Nos. 3,933,974, 4,000,248 and 4,251,499.

Zeolites of the structural type MEL are known from literature. ZSM-11 is described in Nature 275, 119-120, 1978, SSZ-46 in U.S. Pat. No. 5,968,474 and TS-2 in BE1001038.

Zeolites of the structural type MTT are known from literature. ZSM-23 is disclosed in U.S. Pat. No. 4,076,842, EU-13 in U.S. Pat. No. 4,705,674 and ISI-4 in U.S. Pat. No. 4,657,750. In addition, U.S. Pat. No. 5,314,674 deals with the synthesis of zeolites of the structural type MTT.

Zeolites of the structural type MFI are for example known from literature as ZSM-5, ZS-4, AZ-1, FZ-1, LZ-105, NU-4, NU-5, TS-1, TS, USC-4 and ZBH. ZSM-5 is disclosed in U.S. Pat. Nos. 3,702,886 and 4,139,600.

Zeolites of the structural type MWW are known from literature. SSZ-25 is described in U.S. Pat. No. 4,826,667, MCM-22 in Zeolites 15, Issue 1, 2-8, 1995, ITQ-1 in U.S. Pat. No. 6,077,498 and PSH-3 in U.S. Pat. No. 4,439,409.

Zeolites of the structural type SZR are known from literature. SUZ-4 is disclosed in J. Chem. Soc., Chem. Commun., 1993, 894-896.

A preferred zeolite of washcoat layer B which comprises a largest ring size formed by 10 tetrahedrally-coordinated atoms belongs to the structural type FER.

In another embodiment of the present invention, the zeolite of washcoat layer B comprises a largest ring size formed by 12 tetrahedrally-coordinated atoms and belongs for example to the structural type AFI, AFR, AFS, AFY, ASV, ATO, ATS, BEA, BEC, BOG, BPH, CAN, CON, CZP, DFO, EMT, EON, EZT, FAU, GME, GON, IFR, ISV, IWR, IWV, IWW, LTL, MAZ, MEI, MOR, MOZ, MSE, MTW, NPO, OFF, OSI, -RON, RWY, SAO, SBE, SBS, SBT, SFE, SFO, SOS, SSY, USI or VET.

Zeolites of the structural type AFI are AlPO-5, SSZ-24 and SAPO-5. Zeolites of the structural type AFR are SAPO-40 and AlPO-40. A zeolite of the structural type AFS is MAPO-46. A zeolite of the structural type ASV is ASU-7. Zeolites of the structural type ATO are SAPO-31 and AlPO-31. Zeolites of the structural type ATS are SSZ-55 and AlPO-36. Zeolites of the structural type BEA are Beta and CIT-6. Zeolites of the structural type BPH are Linde Q, STA-5 and UZM-4. Zeolites of the structural type CAN are ECR-5, Davyne, Microsommite, Tiptopite and Vishnevite. Zeolites of the structural type CON are CIT-1, SS-26 and SSZ-33. A zeolite of the structural type DFO is DAF-1. Zeolites of the structural type EMT are EMC-2, CSZ-1, ECR-30, ZSM-20 and ZSM-3. Zeolites of the structural type EON are ECR-1 and TUN-7. A zeolite of the structural type EZT is EMM-3. Zeolites of the structural type FAU are Faujasite, LZ-210, SAPO-37, CSZ-1, ECR-30, ZSM-20 and ZSM-3. A zeolites of the structural type GME is Gmelinite. A zeolite of the structural type GON is GUS-1.

Zeolites of the structural type IFR are ITQ-4, MCM-58 and SSZ-42. A zeolite of the structural type ISV is ITQ-7. A zeolite of the structural type IWR is ITQ-24. A zeolite of the structural type IWV is ITQ-27. A zeolite of the structural type IWW is ITQ-22.

Zeolites of the structural type LTL are Linde Typ L and LZ-212. Zeolites of the structural type MAZ are Mazzite, LZ-202, Omega and ZSM-4. Zeolites of the structural type MEI are ZSM-18 and ECR-40. Zeolites of the structural type MOR are Mordenite, LZ-211 and Na-D. A zeolite of the structural type MOZ is ZSM-10. A zeolite of the structural type MSE is MCM-68. Zeolites of the structural type MTW are ZSM-12, CZH-5, NU-13, TPZ-12, Theta-3 and VS-12. Zeolites of the structural type OFF are Offretite, LZ-217, Linde T and TMA-O. A zeolite of the structural type OSI is UiO-6. A zeolite of the structural type RWY is UCR-20. A zeolite of the structural type SAO is STA-1. A zeolite of the structural type SFE is SSZ-48. A zeolite of the structural type SFO is SSZ-51. Zeolites of the structural type SOS are SU-16 and FJ-17. A zeolite of the structural type SSY is SSZ-60. A zeolite of the structural type USI is IM-6. A zeolite of the structural type VET is VPI-8.

A preferred zeolite of washcoat layer B which comprises a largest ring size formed by 12 tetrahedrally-coordinated atoms belongs to the structural type BEA or FAU.

Zeolites of the structural type BEA and FAU, as well as their synthesis are extensively described in literature.

A particularly preferred zeolite of washcoat layer B belongs to the structural type ABW, AEI, AFX, BEA, CHA, ERI, ESV, FAU, FER, KFI, LEV, LTA, MFI, MWW, SOD or STT.

A very particularly preferred zeolite of washcoat layer B belongs to the structural type AEI, BEA, CHA, FAU, FER, LEV or MFI.

In an embodiment of the present invention the zeolite in washcoat layer B does not belong to the structural type BEA.

Washcoat layer B of the catalyst according to the invention comprises palladium. The palladium is present thereby as palladium cation in the zeolite structure, i.e., in ion-exchanged form. However, the palladium may also be wholly or partially present as palladium metal and/or as palladium oxide in the zeolite structure and/or on the surface of the zeolite structure.

In particular, the palladium is present
as palladium cation in the zeolite structure,
as palladium metal in the zeolite structure and/or on the surface on the zeolite structure and/or
as palladium oxide in the zeolite structure and/or on the surface on the zeolite structure.

The palladium is usually present in quantities of 0.01 to 20 wt % in relation to the sum of the weights of zeolite and palladium and calculated as palladium metal. Palladium is preferably present in quantities of 0.5 to 10 wt %, particularly preferably, of 0.5 to 4 wt %, and, very particularly preferably, of 0.5 to 2 wt %, in relation to the sum of the weights of zeolite and palladium and calculated as palladium metal.

In an embodiment of the present invention washcoat layer B comprises platinum. Like palladium, the platinum is preferably present thereby as platinum cation in the zeolite structure, i.e., in ion-exchanged form. However, the platinum may also be wholly or partially present as platinum metal and/or as platinum oxide in the zeolite structure and/or on the surface of the zeolite structure.

The platinum is usually present in quantities of 1 to 10 wt % in relation to the weight of the palladium and calculated as platinum metal.

Platinum is preferably present in quantities of 1 to 8 wt %, particularly preferably, of 1 to 5 wt %, in relation to the weight of the palladium and calculated as platinum metal.

Preferably, washcoat layer B does not comprise any further metal except palladium and if present platinum. In particular, washcoat layer B comprises neither copper, nor iron.

The catalyst according to the invention comprises a carrier substrate. This may be a flow-through substrate or a wall-flow filter.

A wall-flow filter is a supporting body that comprises channels of length L which extend in parallel between a first and a second end of the wall-flow filter, which are alternatingly sealed either at the first or second end, and which are separated by porous walls. A flow-through substrate differs from a wall-flow filter, in particular, in that the channels of length L are open at its two ends.

In an uncoated state, wall-flow filters have, for example, porosities of 30 to 80%—in particular, 50 to 75%. In the uncoated state, their average pore size is 5 to 30 micrometers, for example.

Generally, the pores of the wall-flow filter are so-called open pores, i.e., they have a connection to the channels. Furthermore, the pores are normally interconnected with one another. This enables easy coating of the inner pore surfaces, on the one hand, and an easy passage of the exhaust gas through the porous walls of the wall-flow filter, on the other.

Flow-through substrates are known to the person skilled in the art, as are wall-flow filters, and are commercially available. They consist, for example, of silicon carbide, aluminum titanate, or cordierite.

Usually, the washcoat layers A and B, and if present A1, are present in the form of coatings on the carrier substrate. While washcoat layer A, and if present washcoat layer A1, usually extends over 100% of the length L of the carrier substrate, washcoat layer B preferably extends over 20 to 100% of the length L of the carrier substrate.

In the case of a wall-flow filter, washcoat layers A and B, and if present A1, may be situated on the surfaces of the input channels, on the surfaces of the output channels, and/or in the porous wall between the input and output channels.

In an embodiment of the present invention, washcoat layer A is arranged directly on the carrier substrate and washcoat layer B is coated directly on washcoat layer A.

In another embodiment of the present invention, washcoat layer A is arranged directly on the carrier substrate, washcoat layer A1 is coated directly on washcoat layer A and washcoat layer B is coated directly on washcoat layer A1.

Catalysts according to the invention, in which washcoat layers A and B, and if present A1, are present in the form of a coating on the carrier substrate, may be produced according to the methods familiar to the person skilled in the art, such as according to the usual dip coating methods or pump and suck coating methods with subsequent thermal post-treatment (calcination). A person skilled in the art knows that, in the case of wall-flow filters, their average pore size and the average particle size of the materials to be coated can be adapted to each other such that they lie on the porous walls that form the channels of the wall-flow filter (on-wall coating). The average particle sizes of the materials to be coated may, however, be selected such that said materials are located in the porous walls that form the channels of the wall-flow filter so that the inner pore surfaces are thus coated (in-wall coating). In this instance, the average particle size of the materials to be coated must be small enough to penetrate the pores of the wall-flow filter.

In a preferred embodiment of the present invention, the catalyst comprises a carrier substrate of length L which is a flow-through substrate and two washcoat layers A and B wherein
washcoat layer A comprises
alumina in an amount of 50 to 80 g/L, based on the volume of the carrier substrate;
ceria in an amount of 100 to 130 g/L, based on the volume of the carrier substrate;
a composite material of ceria and alumina which comprises alumina in an amount of 5 to 95 wt %, based on the weight of the composite material in an amount of 10 to 80 g/L, based on the volume of the carrier substrate
magnesium oxide and/or barium oxide in an amount of 15 to 20 g/L, based on the volume of the carrier substrate.
platinum and palladium in a weight ratio of 1:1 to 12:1;
washcoat layer B comprises
a zeolite of the structural type ABW, AEI, AFX, BEA, CHA, ERI, ESV, FAU, FER, KFI, LEV, LTA, MFI, MWW, SOD or STT; and
palladium; and
wherein washcoat layer A is arranged directly on the carrier substrate and washcoat layer B is arranged directly on washcoat layer A.

The catalyst according to the invention is especially suitable as a nitrogen oxide storage catalyst, which is able to store nitrogen oxides until a downstream SCR catalyst is in full operation. It is, therefore, possible, in combination with a downstream SCR catalyst, to effectively convert nitrogen oxides across the entire temperature range of the exhaust gas, including the cold-start temperatures.

The present invention therefore relates to an exhaust gas system comprising
a) a catalyst comprising a carrier substrate of length L and at least two washcoat layers A and B wherein
washcoat layer A comprises
alumina;
ceria;
an alkaline earth compound and/or an alkali compound;
platinum, palladium or platinum or palladium;
washcoat layer B comprises a zeolite and palladium, wherein the palladium is present as palladium cation in the zeolite structure or is wholly or partially present as palladium metal and/or as palladium oxide in the zeolite structure and/or on the surface of the zeolite structure; and
wherein washcoat layer A is arranged below washcoat layer B, and
b) an SCR catalyst.

In principle, the SCR catalyst in the exhaust gas system according to the invention may be selected from all the active catalysts in the SCR reaction of nitrogen oxides with ammonia—particularly such as are commonly known to the person skilled in the art in the field of automotive exhaust gas catalysis. This includes catalysts of the mixed-oxide type, as well as catalysts based upon zeolites—in particular, upon transition metal-exchanged zeolites.

In embodiments of the present invention, SCR catalysts are used that contain a small-pore zeolite with a maximum ring size of eight tetrahedral atoms and a transition metal. Such SCR catalysts are described in, for example, WO2008/106519 A1, WO2008/118434 A1, and WO2008/132452 A2.

In addition, however, large-pore and medium-pore zeolites may also be used, wherein those of the BEA structural type, in particular, come into question. Thus, iron-BEA and copper-BEA are of interest.

Particularly preferred zeolites belong to the BEA, AEI, CHA, KFI, ERI, LEV, MER, or DDR structure types and are particularly preferably exchanged with cobalt, iron, copper, or mixtures of two or three of these metals.

The term, zeolites, here also includes molecular sieves, which are sometimes also referred to as "zeolite-like" compounds. Molecular sieves are preferred, if they belong to one of the aforementioned structure types. Examples include silica aluminum phosphate zeolites, which are known by the term, SAPO, and aluminum phosphate zeolites, which are known by the term, AlPO.

These too are particularly preferred, when they are exchanged with cobalt, iron, copper, or mixtures of two or three of these metals.

Preferred zeolites are also those that have an SAR (silica-to-alumina ratio) value of 2 to 100—in particular, 5 to 50.

The zeolites or molecular sieves contain transition metal—in particular, in quantities of 1 to 10 wt %, and especially 2 to 5 wt %—calculated as metal oxide, i.e., for example, as $Fe_2O_3$ or CuO.

Preferred embodiments of the present invention contain beta-type (BEA), chabazite-type (CHA), or Levyne-type (LEV) zeolites or molecular sieves exchanged with copper, iron, or copper and iron as SCR catalysts. Appropriate zeolites or molecular sieves are known, for example, by the names, ZSM-5, Beta, SSZ-13, SSZ-62, Nu-3, ZK-20, LZ-132, SAPO-34, SAPO-35, AlPO-34, and AlPO-35; see, for example, U.S. Pat. Nos. 6,709,644 and 8,617,474.

In an embodiment of the exhaust gas system according to the invention an injection device for reducing agent is located between the catalyst, which a carrier substrate of length L, palladium, and a zeolite whose largest channels are formed by 8 tetrahedrally-coordinated atoms, and the SCR catalyst.

The person skilled in the art may choose the injection device arbitrarily, wherein suitable devices may be found in the literature (see, for example, T. Mayer, Feststoff-SCR-System auf Basis von Ammoniumcarbamat (Solid SCR System Based upon Ammonium Carbamate), Dissertation, TU Kaiserslautern, 2005). The ammonia as such or in the form of a compound may be introduced via the injection device into the exhaust gas flow from which ammonia is formed under the ambient conditions prevailing. As such, aqueous solutions of urea or ammonium formiate, for example, come into consideration, as does solid ammonium carbamate. As a rule, the reducing agent or precursor thereof is held available in an accompanying container which is connected to the injection device.

The SCR catalyst is preferably present in the form of a coating on a supporting body, which may be a flow-through substrate or a wall-flow filter and may, for example, consist of silicon carbide, aluminum titanate, or cordierite.

Alternatively, however, the supporting body itself may also consist of the SCR catalyst and a matrix component as described above, i.e., be present in extruded form.

The present invention also relates to a method for the cleaning of exhaust gases from motor vehicles that are operated by lean-burn engines, e.g., diesel engines, which method is characterized in that the exhaust gas is channeled through an exhaust gas system according to the invention.

The invention claimed is:

1. A catalyst comprising a carrier substrate of length L, which is a flow-through substrate, and at least two washcoat layers A and B wherein
washcoat layer A comprises
alumina in an amount of 50 to 80 g/L, based on the volume of the carrier substrate;)
ceria in an amount of 100 to 130 g/L, based on the volume of the carrier substrate;
a composite material of ceria and alumina which comprises alumina in an amount of 5 to 95 wt %, based on the weight of the composite material in an amount of 10 to 80 g/L, based on the volume of the carrier substrate;
magnesium oxide and/or barium oxide in an amount of 15 to 20 g/L, based on the volume of the carrier substrate; and
platinum and palladium in a weight ratio of 1:1 to 12:1;
washcoat layer B comprises a zeolite of the structural type ABW, AEI, AFX, BEA, CHA, ERI, ESV, FAU, FER, KFI, LEV, LTA, MFI, MWW, SOD or STT and palladium, wherein the palladium is present as (i) a palladium cation in the zeolite structure and/or (ii) is present as either or both of a palladium metal or a palladium oxide located in, on, or both in and on the zeolite structure; and
wherein washcoat layer A is arranged directly on the carrier substrate and washcoat layer B is arranged directly on washcoat layer A.

2. The catalyst according to claim 1, characterized in that washcoat layer A further comprises rhodium.

3. The catalyst according to claim 1, characterized in that it comprises a third washcoat layer A1 which comprises rhodium.

4. The catalyst according to claim 1, characterized in that washcoat layer B further comprises platinum.

5. An exhaust gas system comprising
a) a catalyst according to claim 1, and
b) an SCR catalyst.

6. A method for cleaning exhaust gases from motor vehicles that are operated with lean-burn engines, characterized in that the exhaust gas is channeled through an exhaust gas system according to claim 5.

7. The catalyst according to claim 1, wherein the palladium in washcoat layer B is present as a palladium cation in the zeolite structure.

8. The catalyst according to claim 1, wherein the palladium in washcoat layer B is present as a palladium metal located in, on, or both in and on the zeolite structure.

9. The catalyst according to claim 1 wherein the palladium in washcoat layer B is present as a palladium oxide located in, on, or both in and on the zeolite structure.

* * * * *